G. F. Rice,
Boring Wood.
Nº 22,379.          Patented Dec. 21, 1858.

Inventor:
George F. Rice.

UNITED STATES PATENT OFFICE.

GEO. F. RICE, OF WORCESTER, MASSACHUSETTS.

MACHINE FOR BORING WOOD.

Specification forming part of Letters Patent No. 22,379, dated December 21, 1858; Reissued August 3, 1869, No. 3,574.

*To all whom it may concern:*

Be it known that I, GEORGE F. RICE, of Worcester, in the county of Worcester and State of Massachusetts, have invented a new and useful Improvement on the Boring-Machines Commonly Used by Carpenters and Builders; and I do hereby declare that the following is a full, clear, and exact description of the construction and operation of the same, reference being had to the accompanying drawings, making a part of this specification, in which—

Figure 1:
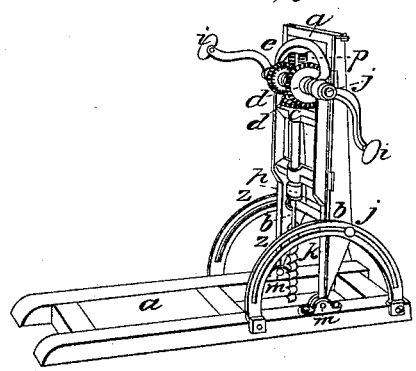
Figure 2:
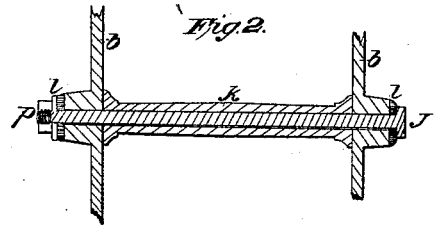

Figure 1 is a perspective view. Fig. 2 is a transverse section of the same taken through and in a line of the axis of the upright.

Same letters indicate like parts in both figures.

My invention consists of arranging the uprights by means of semicircles attached to the sides of the bed piece or bottom of the machine with slots that allow the uprights to vibrate and stand at any angle required, by means of a double headed bolt which passes through the crosspiece and slides in the slots of the semicircles with a nut on the opposite end to make the uprights act at any angle desired, thus enabling the operator to bore a hole on any angle required. It also saves dealers much time and trouble, as they do not have to take them apart or put them together for selling or transportation. By shutting down the upright part of the machine they are ready for boring without detaching any part of the machine. If desired every part can be separated, but in boring it is not necessary.

In the accompanying drawings (*a*) represents the bed piece or bottom of the machine; (*b*) the sides or upright.

(*c*) is the carriage which moves down on the ways of the upright as the auger draws in.

(*d d*) are the two bevel gears.

(*e*) is the pinion gear.

(*f*) is the rack on the uprights into which the pinion gear is slipped to draw the auger out.

(*g*) is the horizontal shaft which passes through one of the bevel and pinion gears to which the cranks are attached.

(*h*) is the perpendicular shaft into which the auger is fastened in the socket by means of a set screw and driven by aid of the bevel gears (*d d*).

(*i i*) are the cranks which operate the machine.

(*j*) is the double headed bolt which passes through the semicircles and cross bar (*k*) to fasten the uprights at any angle required. The object of a double head to this bolt is to prevent its turning when the nut is being turned.

(*k*) is the hollow cross bar through which the bolt passes.

(*l l*) represent the two semicircles which the bolt *j* slides as the upright vibrates.

(*m m*) are the joints at the bottom of the uprights forming a center of the circle.

(*n*) is the top or cross piece to which the spring is fastened to hold the slide up when the auger is drawn out. (*o*) represents this spring.

I do not claim the joints and semicircles, as that has been known before, but

What I do claim and desire to secure by Letters Patent is—

The hollow cross-bar together with the double head bolt which enables the operator to fasten the uprights at any angle, by simply turning one nut, the whole being constructed substantially in the manner as above described, and for the purposes herein specified.

GEORGE F. RICE.

Witnesses:
HARTLEY WILLIAMS,
MELVILLE WOOD.

[FIRST PRINTED 1911.]